United States Patent
Song et al.

(10) Patent No.: US 7,649,557 B2
(45) Date of Patent: Jan. 19, 2010

(54) APPARATUS FOR PROCESSING A DIGITAL IMAGE SIGNAL AND METHODS FOR PROCESSING A DIGITAL IMAGE SIGNAL

(75) Inventors: Suk-Beom Song, Gyeonggi-do (KR); Jae-Hoon Seo, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 450 days.

(21) Appl. No.: 11/545,342

(22) Filed: Oct. 10, 2006

(65) Prior Publication Data

US 2007/0139538 A1    Jun. 21, 2007

(30) Foreign Application Priority Data

Dec. 20, 2005    (KR)    .................. 10-2005-0126067

(51) Int. Cl.
| | |
|---|---|
| H04N 5/208 | (2006.01) |
| H04N 9/64 | (2006.01) |
| G06K 9/48 | (2006.01) |
| G06K 9/40 | (2006.01) |
| H04N 1/46 | (2006.01) |

(52) U.S. Cl. .................. 348/252; 348/253; 382/199; 382/266; 358/532

(58) Field of Classification Search .................. 348/252, 348/253; 382/266
See application file for complete search history.

(56) References Cited

U.S. PATENT DOCUMENTS

| | | | | |
|---|---|---|---|---|
| 5,808,697 | A | 9/1998 | Fujimura et al. | ............. 348/672 |
| 6,628,330 | B1 * | 9/2003 | Lin | .............................. 348/252 |
| 6,774,943 | B1 * | 8/2004 | Kao et al. | .................... 348/252 |
| 6,850,275 | B1 * | 2/2005 | Minakami | .................... 348/252 |
| 6,882,365 | B1 * | 4/2005 | Aoki | ........................... 348/273 |
| 7,139,022 | B1 * | 11/2006 | Raffy | .......................... 348/273 |
| 2005/0030396 | A1 * | 2/2005 | Park et al. | .................... 348/252 |
| 2005/0238225 | A1 * | 10/2005 | Jo et al. | ....................... 382/162 |

FOREIGN PATENT DOCUMENTS

| | | |
|---|---|---|
| JP | 9-65252 | 3/1997 |
| JP | 2002-232728 | 8/2002 |
| KR | 10-2000-0050571 | 8/2000 |
| KR | 10-2005-0085140 | 8/2005 |
| WO | 2004/049293 | 6/2004 |

* cited by examiner

*Primary Examiner*—John M Villecco
*Assistant Examiner*—Wanda M Negron
(74) *Attorney, Agent, or Firm*—Myers Bigel Sibley & Sajovec

(57) ABSTRACT

An apparatus for processing a digital image signal includes a pseudo-luminance generator configured to generate pseudo-luminance signals from the image signal. An edge detector detects an edge in the image signal using a part of an interpolated image signal as a luminance signal for a line of the image signal including a pixel subjected to edge detection and using the pseudo-luminance signals for adjacent lines. A color suppressor suppresses pseudo-color present in the chrominance component of the image signal in response to a detected edge. A compensator may be provided to generate a second edge metric relative to the image signal to compensate for an edge detection error occurring in the edge detector. A color suppression coefficient calculator to generate a color suppression coefficient using a first edge metric generated by the edge detector and the second edge metric. Corresponding systems and methods are disclosed.

25 Claims, 13 Drawing Sheets

FIG. 12 (PRIOR ART)

|      |     |     |     |     |     |
|------|-----|-----|-----|-----|-----|
| a+2  | P11 | P12 | P13 | P14 | P15 |
| a+1  | P21 | P22 | P23 | P24 | P25 |
| a    | P31 | P32 | P33 | P34 | P35 |
| a−1  | P41 | P42 | P43 | P44 | P45 |
| a−2  | P51 | P52 | P53 | P54 | P55 |

FIG. 13 (PRIOR ART)

|  |  |  |  |  |  |
|---|---|---|---|---|---|
| a+2 | R | G | R | G | R |
| a+1 | G | B | G | B | G |
| a | R | G | R | G | R |
| a−1 | G | B | G | B | G |
| a−2 | R | G | R | G | R |

APPARATUS FOR PROCESSING A DIGITAL IMAGE SIGNAL AND METHODS FOR PROCESSING A DIGITAL IMAGE SIGNAL

CROSS-REFERENCE TO RELATED APPLICATION

This application claims priority under 35 U.S.C. § 119 to Korean Patent Application No. 10-2005-0126067, filed on Dec. 20, 2005, in the Korean Intellectual Property Office, the disclosure of which is incorporated herein by reference in its entirety.

FIELD OF THE INVENTION

The present invention relates to methods and apparatus for processing a digital image signal and systems including the same, and more particularly, to a digital image signal processing apparatus and methods and related systems for suppressing pseudo-color components of a digital image signal.

BACKGROUND

A digital image signal processing apparatus digitally processes an analog or digital Bayer pattern signal provided from a complementary metal oxide semiconductor (CMOS) image sensor and/or a charge coupled device (CCD) to provide a displayable image signal. Accordingly, the digital image signal processing apparatus operates to restore an original signal as fully as possible from the Bayer pattern signal.

In order to facilitate storage and processing thereof, an image signal may be digitized. Accordingly, the original analog signal may be subjected to analog-to-digital conversion in an image sensor or a digital image signal processing apparatus. As is well known, digitizing is performed by sampling an analog signal. According to sampling theory, if a sampling frequency is not at least double the highest frequency component of the original signal, then aliasing, in which an incorrect frequency signal is output, may occur. To prevent aliasing, a low pass filter is typically used at a position where a signal is input to a digital image signal processing apparatus to attenuate high-frequency components of the input signal. However, the cut-off frequency of the low pass filter may be higher than the sampling frequency, potentially causing aliasing to occur due to high-frequency components of the input signal.

When aliasing occurs, a color component that does not exist in the original image, i.e., a pseudo-color, may appear at or near a high frequency edge of the digitized image. In particular, a pseudo-color may appear as noise in a high-frequency region of the digital image signal in which only a luminance component should be present. In this situation, the outline of an image may appear jagged in a stair-stepping appearance, which may reduce image quality.

FIG. 1 is a block diagram of a conventional digital image signal processing apparatus 100 having a line memory 10 including four lines and using a 5*5 edge detection mask to provide five line signals a−2 to a+2. FIG. 11 illustrates a Bayer signal corresponding to five lines provided through the line memory 10. Hereinafter, a conventional method of processing a digital image signal will be described with reference to FIGS. 1, 11 and 12.

The conventional digital image signal processing apparatus 100 includes a line memory 10 having a plurality of lines LM1 through LM4 to store a Bayer digital signal in line units. An interpolator 12 performs interpolation using Bayer pattern signals simultaneously provided in line units from the line memory 10 to generate interpolated RGB values for each pixel, and a color space converter 13 is configured to convert the interpolated RGB signal to a YCbCr format including a luminance component Y and chrominance components Cb/Cr. A pseudo-luminance generator 11 is configured to generate pseudo-luminance values to be used for edge detection using the Bayer pattern signals provided from the line memory 10. An edge detector 14 detects an edge in the image signal using the pseudo-luminance values, and an edge enhancer 15 enhances an edge of a luminance component signal Y obtained through color space conversion using an output of the edge detector 14. A color suppression coefficient calculator 16 performs a non-linear conversion using edge information provided from the edge detector 14 to calculate a color suppression coefficient, and a color suppressor 17 suppresses pseudo-color components included in the chrominance components Cb/Cr of the converted signal using the color suppression coefficient.

The pseudo-luminance generator 11 calculates a pseudo-luminance value using only green color values, which may primarily influence luminance from among the red, green, and blue (RGB) color values of a pixel.

Since an edge may be considered to be located at a portion of an image where the brightness of pixels changes rapidly, the luminance value Y, which corresponds to the brightness of a corresponding pixel, may be used for edge detection. Conventionally, after a signal is processed by the interpolator 12, i.e., after an RGB value is allocated to each pixel, a Y value of each pixel is extracted and used for edge detection. Since the Y value depends more on the green (G) than the red (R) or blue (B), the G value is typically directly used as the Y value. However, in order to use an interpolated G value as a pseudo-luminance value for edge detection, G values need to be provided for pixels in a window, e.g., a 5*5 window, needed for the edge detection, and, therefore, a line memory having almost the same size as the line memory 10 may be needed to store the interpolated G values for use in edge detection.

In order to reduce the burdens associated with an increase in the density of integration of a digital image processing device, a pseudo-luminance generator 11 as shown in FIG. 1 may be provided. That is, by using a pseudo-luminance generator 11 to generate pseudo-luminance values for use in edge detection, a separate line memory may not be required. For example, if the line memory 10 uses about 50,000 gates, the pseudo-luminance generator 11 may use less than about 1,000 gates, thus providing a significant advantage in terms of size.

FIG. 12 illustrates a 5×5 window, and FIG. 13 illustrates a Bayer pattern for all pixels in the 5×5 window illustrated in FIG. 12. Hereinafter, a conventional procedure of generating pseudo-luminance values YG−2, YG−1, YG, YG+1, and YG+2 will be described briefly with reference to FIGS. 12 and 13.

Usually, two kinds of methods are used to generate luminance. In both methods, a G value may be used as is when a pixel has G color.

In a first method, for example, for a pixel P11, a mean of four pixels P11, P12, P21, and P22, i.e., (P11+P12+P21+P22)/4 is used as a YG value.

In a second method, for example, for a pixel P33 having R color, a mean of two pixels, which are adjacent to the pixel P33 and have a least difference between their G values among a pair of pixels adjacent thereto in a horizontal direction and a pair of pixels adjacent thereto in a vertical direction, is used as a YG value. In other words, if a difference between pixels P32 and P34 is less than a difference between pixels P23 and P43, a mean of the two pixels P32 and P34, i.e., (P32+P34)/2 is used as the YG value.

When the YG value is provided to each line with this method, the edge detector 14 creates a 5×5 or 3*3 window comprised of YG values and detects an edge using the window. Edge detection is performed by generating an edge metric based appropriate G values and comparing the edge metric to a threshold to identify the presence or absence of an edge.

In conventional edge detection techniques, the pseudo-luminance values YG−2 through YG+2 for respective lines are calculated by taking a mean using a Bayer pattern signal, which is not converted into an RGB format through interpolation. Accordingly, the pseudo-luminance values YG−2 through YG+2 may be less accurate than Y values calculated using the color space converter 13 from RGB values that are obtained through interpolation,.

As a result, high-frequency components of an original image may be lost due to inaccurate Y values, and edge detection may increasingly fail. Pseudo-colors may appear at a portions of an image where edge detection fails.

SUMMARY

Embodiments of the present invention provide a digital image signal processing apparatus capable of suppressing pseudo-color occurring due to noise components, and systems including the same. Some embodiments of the invention provide digital image signal processing methods allowing suppression of pseudo-color.

An apparatus for processing a digital image signal according to some embodiments of the invention includes an interpolator configured to interpolate a digital Bayer pattern signal to provide an interpolated image signal, a color space converter configured to convert the interpolated image signal into a converted signal having a format including a luminance component and a chrominance component, and a pseudo-luminance generator configured to generate pseudo-luminance signals for respective lines of the Bayer pattern signal. The apparatus includes an edge detector configured to detect an edge in the Bayer pattern signal using a part of the interpolated signal as a luminance signal for a line of the Bayer pattern signal including a pixel subjected to edge detection, and using the pseudo-luminance signals for adjacent lines. A color suppression coefficient calculator is configured to generate a color suppression coefficient in response to edge information provided from the edge detector, and a color suppressor is configured to suppress pseudo-color present in the chrominance component of the converted signal using the color suppression coefficient.

The edge detector may be configured to use a signal that primarily influences luminance in the interpolated signal as the luminance signal with respect to the line including the pixel subjected to edge detection.

The pseudo-luminance generator may be configured to generate the pseudo-luminance signals using at least a color that primarily influences the luminance in the Bayer pattern signal.

The apparatus may further include a line memory including N−1 lines, the Bayer pattern signal may be input in parallel through N lines and N may be an integer greater than 2.

The apparatus may further include an edge enhancer configured to enhance edge information in the luminance component of the converted signal in response to an output of the edge detector.

According to some embodiments of the invention, an apparatus for processing a digital image signal includes an interpolator configured to interpolate a digital Bayer pattern signal to provide an interpolated image signal, a color space converter configured to convert the interpolated image signal into a converted signal having format including a luminance component and a chrominance component, and a pseudo-luminance generator configured to generate pseudo-luminance signals for respective lines of the Bayer pattern signal. An edge detector is configured to generate a first edge metric relative to the Bayer pattern signal using a part of the interpolated image signal as a luminance signal for a line of the Bayer pattern signal including a pixel subjected to edge detection, and using the pseudo-luminance signals for adjacent lines. A compensator is configured to generate a second edge metric relative to the Bayer pattern signal to compensate for an edge detection error occurring in the edge detector. A color suppression coefficient calculator is configured to generate a color suppression coefficient using the first edge metric and the second edge metric, and a color suppressor is configured to suppress pseudo-color present in the chrominance component of the converted signal using the color suppression coefficient.

The compensator may be configured to compensate for an edge detection error occurring in a vertical direction in the edge detector. The compensator may be configured such that, if no edge may be found by the edge detector, the absence of an edge may be verified using the compensator. In particular, the compensator may be configured to multiply a sum of luminance differences between adjacent pixels in each of vertical and horizontal lines in an edge detection window by a corresponding gain, thereby generating gradients of the respective vertical and horizontal lines, and to output a largest one of the gradients as a value of the second edge metric.

The edge detector may be configured to use a signal that primarily influences luminance in the interpolated signal as the luminance signal with respect to the line including the pixel subjected to the edge detection.

The pseudo-luminance generator may be configured to generate the pseudo-luminance signals using at least a color that primarily influences the luminance in the Bayer pattern signal.

The apparatus may further include a line memory including N−1 lines, the Bayer pattern signal may be input in parallel through N lines, and N may be in integer greater than 2.

The apparatus may further include an edge enhancer configured to enhance edge information in the luminance component of the converted signal in response to an output of the edge detector.

Some embodiments of the invention provide a system including an optical sensing apparatus configured to receive an optical signal and to convert the optical signal into a digital Bayer pattern signal, and a digital image signal processing apparatus configured to perform digital image processing on the Bayer pattern signal. The digital image signal processing apparatus may include an edge detector configured to detect an edge in the Bayer pattern signal using a part of an interpolated signal as a luminance signal for a line of the Bayer pattern signal including a pixel subjected to edge detection and using pseudo-luminance signals for adjacent lines.

Systems according to further embodiments include an optical sensing apparatus configured to receive an optical signal and to convert the optical signal into a digital Bayer pattern signal, and a digital image signal processing apparatus configured to perform digital image processing on the Bayer pattern signal. The digital image signal processing apparatus may include an interpolator configured to interpolate the Bayer pattern signal to provide an interpolated image signal, a color space converter configured to convert the interpolated image signal into a format including a luminance component and a chrominance component, and a pseudo-luminance generator configured to generate pseudo-luminance signals for respective lines of the Bayer pattern signal. The digital image signal processing apparatus may further include an edge detector configured to generate a first edge metric relative to the Bayer pattern signal using a part of the interpolated image signal as a luminance signal for a line of the Bayer pattern signal including a pixel subjected to edge detection and using the pseudo-luminance signals for adjacent lines.

The digital image signal processing apparatus may further include a compensator configured to generate a second edge metric in relative to the Bayer pattern signal to compensate for an edge detection error occurring in the edge detector, a color suppression coefficient calculator configured to generate a color suppression coefficient using the first edge metric and the second edge metric, and a color suppressor configured to suppress pseudo-color present in the chrominance component of the converted signal using the color suppression coefficient.

The system may further include a display apparatus configured to display an image using an image signal provided from the digital image signal processing apparatus.

Methods of processing a digital image signal according to some embodiments of the invention include interpolating a digital Bayer pattern signal to form an interpolated image signal, generating pseudo-luminance values using the Bayer pattern signal, converting the interpolated image signal into a format expressed in luminance and chrominance to generate a converted signal, and detecting an edge in the Bayer pattern signal using a part of the interpolated image signal as a luminance signal for a line including a pixel subjected to edge detection and using the pseudo-luminance values for adjacent lines. A color suppression coefficient is generated in response to the edge detection, and pseudo-color present in the chrominance of the converted signal is suppressed using the color suppression coefficient.

Detecting the edge may include detecting the edge using a signal that primarily influences luminance in the interpolated image signal as the luminance signal with respect to the line including the pixel subjected to the edge detection.

Generating the pseudo-luminance values may include generating the pseudo-luminance values using at least a color that primarily influences the luminance in the Bayer pattern signal.

Methods of processing a digital image signal according to further embodiments of the invention include interpolating a digital Bayer pattern signal to generate an interpolated image signal, generating pseudo-luminance values to be used for edge detection using the Bayer pattern signal, converting the interpolated image signal into a format expressed in luminance and chrominance, and generating a first edge metric in the Bayer pattern signal using a part of the interpolated image signal as a luminance signal for a line including a pixel subjected to edge detection and using the pseudo-luminance values for adjacent lines. A second edge metric is generated from the Bayer pattern signal to compensate for an edge detection error occurring in the first edge metric, and a color suppression coefficient is generated in response to the first edge metric and the second edge metric. Pseudo-color present in the chrominance of the converted signal is suppressed using the color suppression coefficient.

Generating the second edge metric may include compensating for an edge detection error occurring in a vertical direction during the generation of the first edge metric. If no edge is indicated by the first edge metric, the absence of an edge may be verified through the generation of the second edge metric.

Generating the second edge metric may include multiplying a sum of luminance differences between adjacent pixels in each of vertical and horizontal lines in an edge detection window by a corresponding gain to generate gradients of the respective vertical and horizontal lines, and outputting a largest one of the calculated gradients as a value of the second edge metric.

Generating the first edge metric may include detecting an edge using a signal that primarily influences luminance in the interpolated signal as the luminance signal with respect to the line including the pixel subjected to the edge detection.

Generating the pseudo-luminance values may include generating the pseudo-luminance values using at least a color that primarily influences the luminance in the Bayer pattern signal.

BRIEF DESCRIPTION OF THE DRAWINGS

The above and other features and advantages of the present invention will become more apparent by describing in detail embodiments thereof with reference to the attached drawings in which:

FIG. 12 illustrates a 5×5 window; and

FIG. 13 illustrates a Bayer pattern for all pixels in the 5×5 window illustrated in FIG. 12.

DETAILED DESCRIPTION OF EMBODIMENTS OF THE INVENTION

Figure 1:
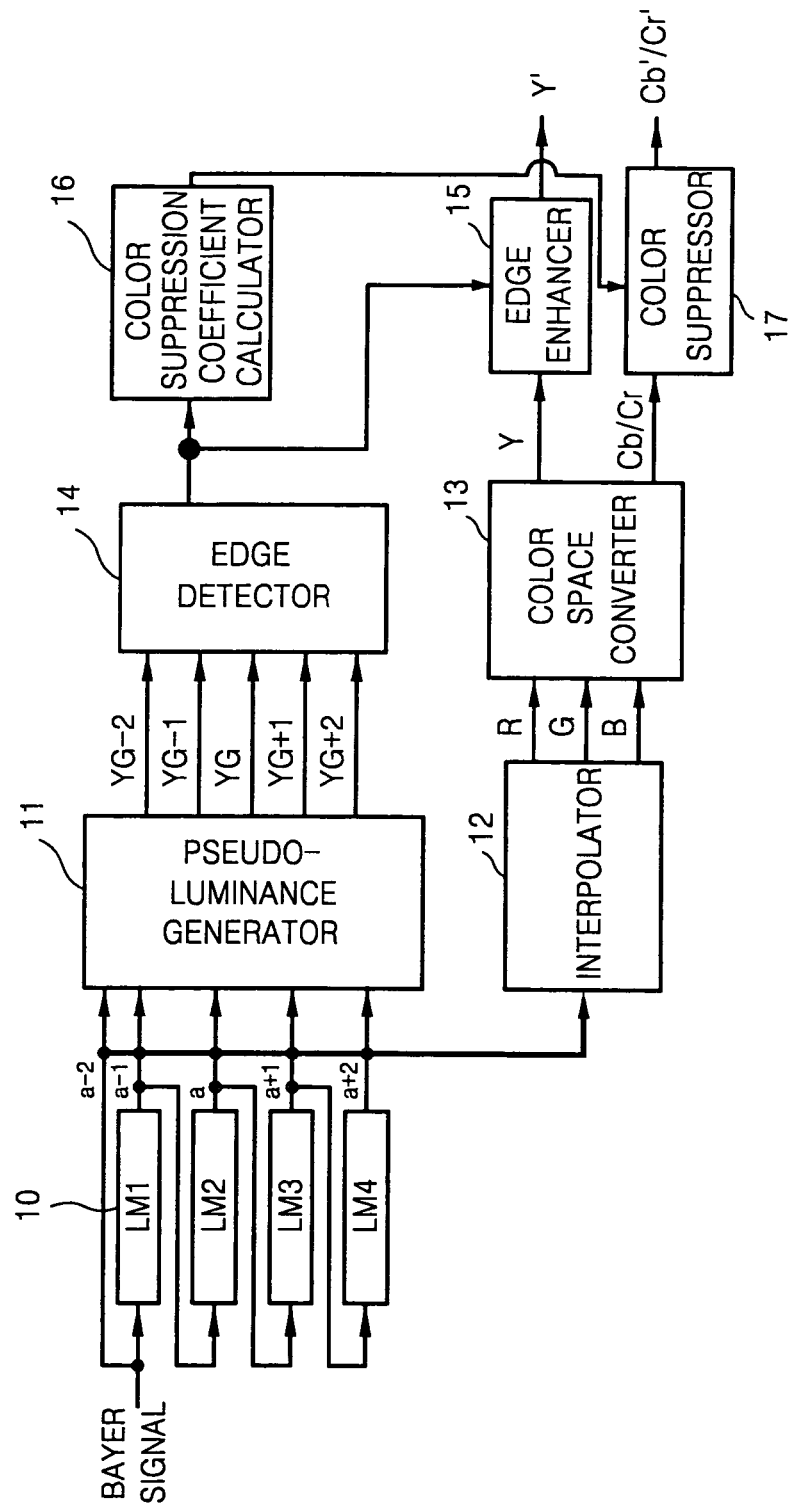
FIG. 1 is a block diagram of a conventional digital image signal processing apparatus.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein. The present invention is described below with reference to flowchart illustrations and/or block diagrams of methods, systems and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, signal processor, or other programmable data processing apparatus to produce a machine, such that the instructions, which execute via the processor of the computer or other programmable data processing apparatus, create means for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Figure 2:
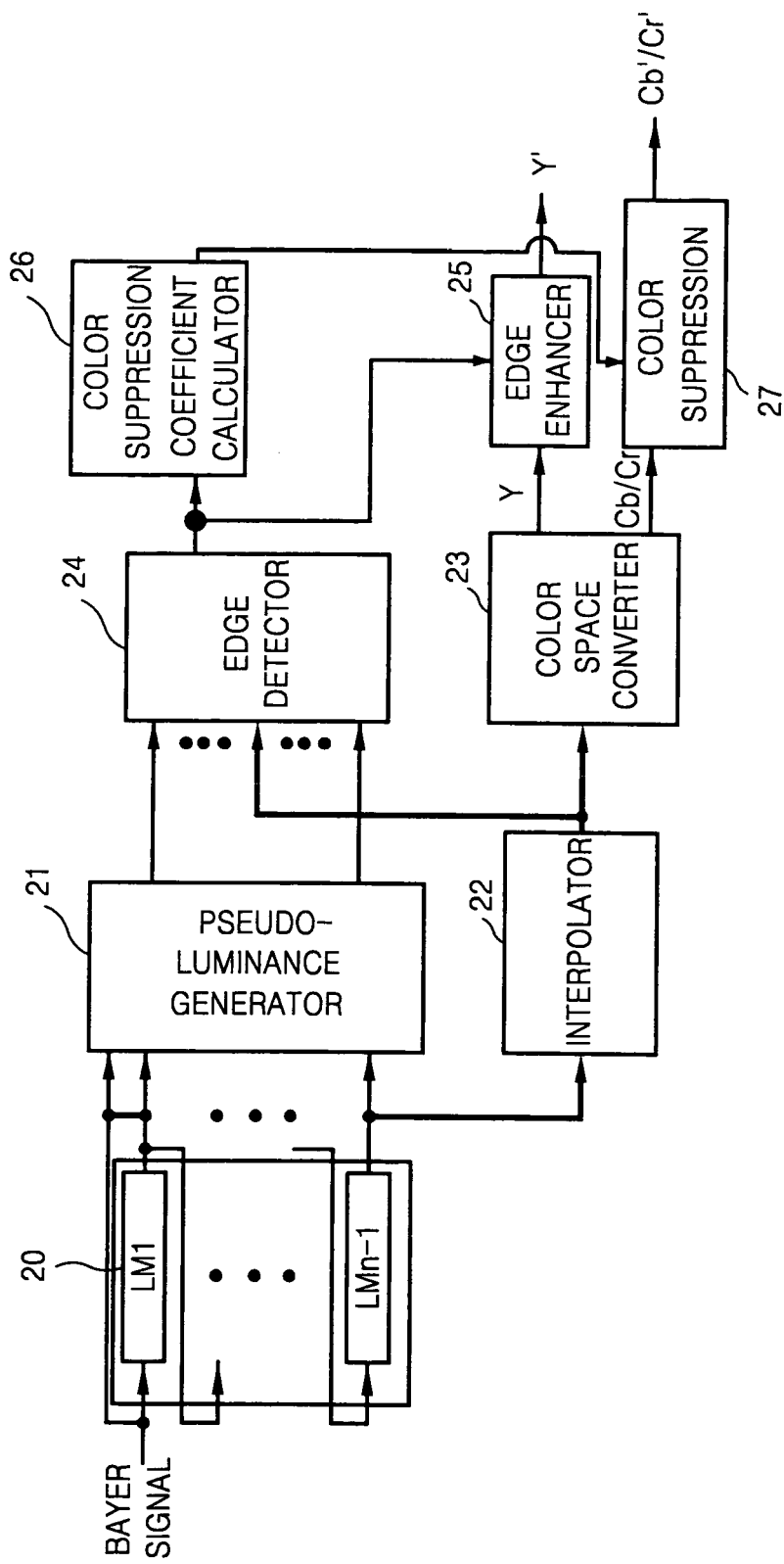
FIG. 2 is a block diagram of a digital image signal processing apparatus according to some embodiments of the present invention.

FIG. 2 is a block diagram of a digital image signal processing apparatus 200 according to some embodiments of the present invention. Referring to FIG. 2, the digital image signal processing apparatus 200 includes a line memory 20 having a plurality of lines LM1 through LMn-1 (where "n" is an integer greater than 1) to store a digital Bayer pattern signal in line units. An interpolator 22 performs interpolation using Bayer pattern signals simultaneously provided from the line memory 20 through the lines LM1 through LMn-1 to generate an interpolated image signal, and a color space converter 23 is configured to convert the interpolated image signal to a format including a luminance component and chrominance components.

A pseudo-luminance generator 21 is configured to generate a pseudo-luminance signal for each line as a luminance component to be used for edge detection. The pseudo-luminance signal is generated using only one color, which primarily influences luminance in an image signal of a Bayer pattern, based on the Bayer pattern signals provided from the line memory 20. An edge detector 24 detects an edge in the image signal using, as a luminance signal, an interpolated signal for a line including pixels to be subjected to edge detection, and using pseudo-luminance signals from the pseudo-luminance generator 21 for the other lines. The interpolated signal used for edge detection is provided via a line 28. The interpolated signal used for edge detection may include an interpolated luminance value for a color that primarily influences the luminance of the image.

An edge enhancer 25 enhances an edge of a luminance component signal Y obtained through color space conversion using an output of the edge detector 24. A color suppression coefficient calculator 26 performs non-linear conversion using edge information provided from the edge detector 24 to calculate a color suppression coefficient, and a color suppressor 27 suppresses pseudo-color components included in chrominance component signals Cb/Cr using the color suppression coefficient.

In the structure illustrated in FIG. 2, the Bayer pattern signal may have any of various different formats, such as an RGB format, a YMgCy format, an RGBK format, and/or a YMgCyG format. In addition, a signal including a luminance component and chrominance components generated by the color space converter 23 may be have, for example, a Y/Cb/Cr format, a YUV format, a YIQ format, or another format including luminance and chrominance values.

As described above, in some embodiments of the present invention, a value such as a G value, which primarily influences luminance in a signal interpolated by the interpolator 22, is used as a luminance value for a line including pixels to be subjected to edge detection. That is, the G value may be used for edge detection instead of a YG value from the pseudo-luminance generator 21. Since an edge component is considered during the interpolation, the luminance value obtained from the interpolated signal includes some original edge information. The interpolated signal is used to provide a luminance value for a line including pixels subjected to edge detection. Since the pseudo-luminance generator 21 uses a signal that is not interpolated, an output of the pseudo-luminance generator 21 is referred to as a "pseudo-luminance value".

The edge detector 24 may use a first-order differentiation using a gradient, such as Roberts, Prewitt or Sobel edge detection, or a second-order differentiation, such as Laplacian or Laplacian of Gaussian (LoG) edge detection.

The color suppression coefficient calculator 26 performs non-linear conversion using edge information to calculate a color suppression coefficient. Since the occurrence of pseudo-color may increase when an edge component increases, the color suppression coefficient calculator 26 multiplies an absolute value obtained by the edge detector 24 by a gain. In order to suppress color only at an edge having a value greater than a threshold, the color suppression coefficient calculator 26 multiplies the absolute value of an edge value by the gain and compares the result with the threshold. The threshold may be set by a user. If the multiplication result exceeds the threshold with respect to an edge, a slope is set to suppress color at the edge. The slope may also be set by the user. The color suppression coefficient is calculated by multiplying the product of the absolute value of the edge and the gain by the slope, and then subtracting the result from a value of "1". Consequently, the color suppression coefficient may have a maximum value of "1" for a region where an edge value is less than the threshold and approaches a value of "0" as the edge value increases.

The color suppressor 27 multiplies the color suppression coefficient by a chrominance component, e.g., a Cb/Cr value, thereby outputting Cb'/Cr' with reduced pseudo-color. Accordingly, when an edge gets sharper, more color suppression is performed.

Figure 3:
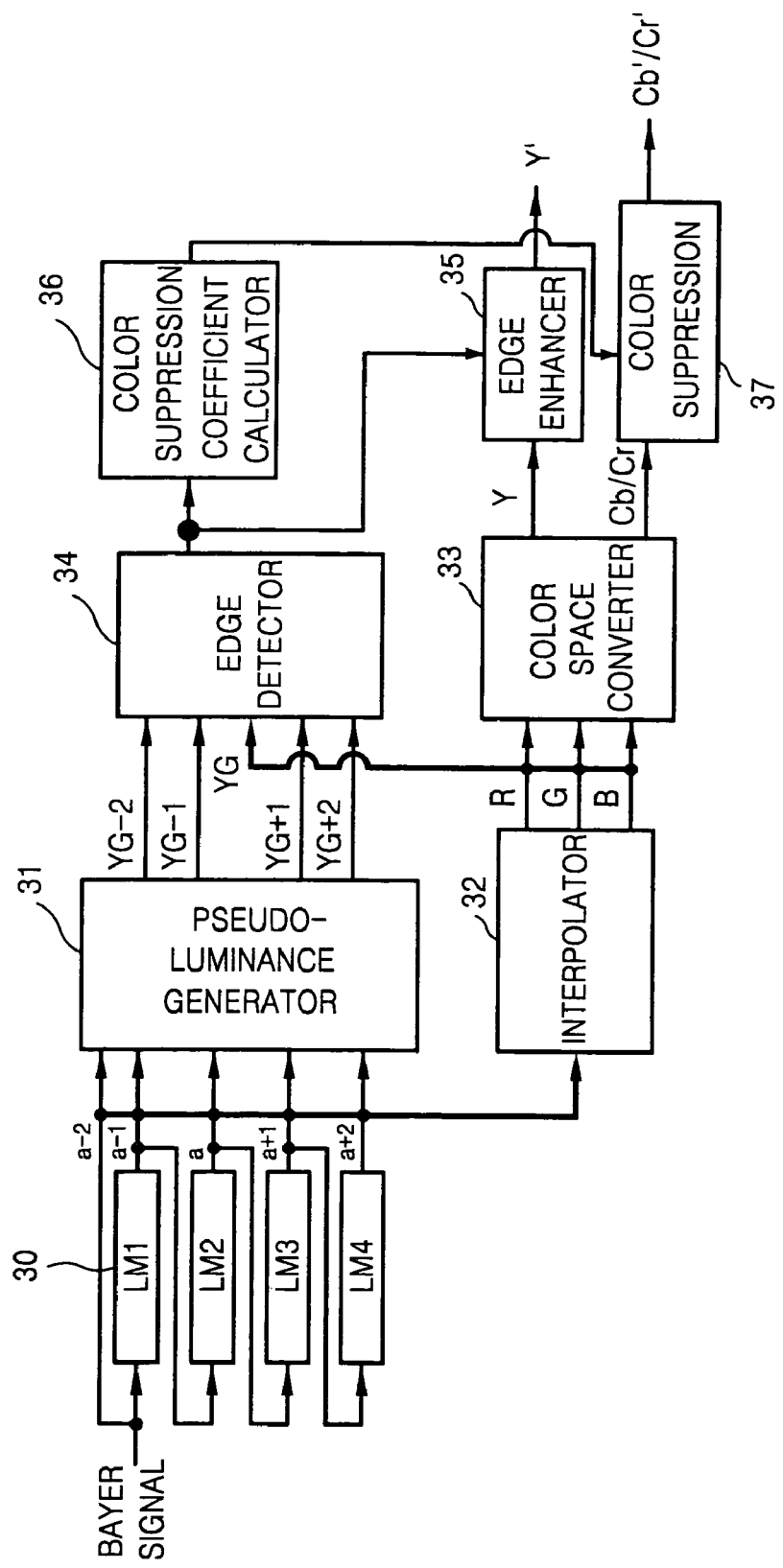
FIG. 3 illustrates an example in which a 5×5 window and a Bayer pattern having an RGB format are used in the digital image signal processing apparatus illustrated in FIG. 2.

FIG. 3 illustrates a digital image processing apparatus 300 according to some embodiments of the invention in which a 5×5 window and a Bayer pattern having an RGB format are used, for example, in the digital image signal processing apparatus 200 illustrated in FIG. 2.

Referring to FIG. 3, the digital image signal processing apparatus 300 includes a line memory 30 having a plurality of lines LM1 through LMn−1 (where "n" is an integer greater than 1) to store a Bayer digital signal in line units. An interpolator 32 performs interpolation using Bayer pattern signals simultaneously provided from the line memory 30 through the lines LM1 through LMn−1 to generate interpolated RGB values for each pixel, and a color space converter 33 is configured to convert the interpolated RGB signal to a format including a luminance component Y and chrominance components Cb/Cr.

A pseudo-luminance generator 31 is configured to generate a pseudo-luminance signal for each line as a luminance component to be used for edge detection. The pseudo-luminance signal is generated using only one color, such as a color that primarily influences luminance in an image signal of a Bayer pattern, based on the Bayer pattern signals provided from the line memory 30. For example, in an RGB Bayer pattern, the pseudo-luminance signal may be generated using the G values. An edge detector 34 detects an edge in the image signal using, as a luminance signal, a color that primarily influences luminance in an interpolated signal for a line including pixels to be subjected to edge detection, and using pseudo-luminance signals for other lines. The interpolated signal used for edge detection is provided via a line 38.

An edge enhancer 35 enhances an edge of a luminance component signal Y obtained through color space conversion using an output of the edge detector 34. A color suppression coefficient calculator 36 performs non-linear conversion using edge information provided from the edge detector 34 to calculate a color suppression coefficient, and a color suppressor 37 suppresses pseudo-color components included in chrominance component signals Cb/Cr using the color suppression coefficient.

Figure 11:
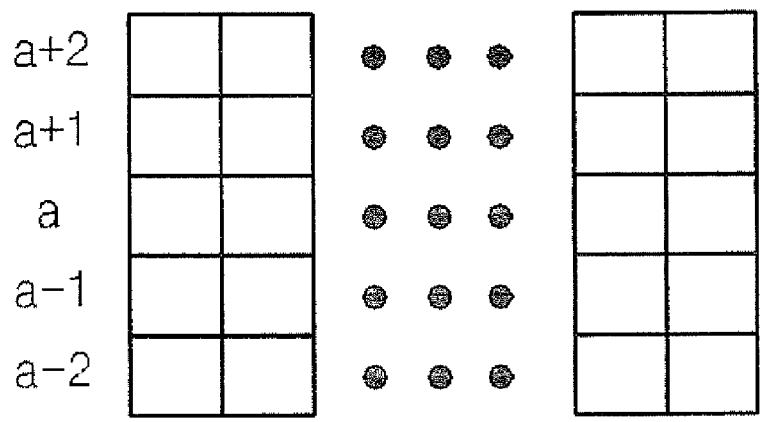
FIG. 11 illustrates a Bayer signal corresponding to five lines provided in a line memory.

If a 5×5 window is used, Bayer pattern signals for at least five lines are needed simultaneously. Accordingly, a line memory 30 including four lines LM1 through LM4 is needed. For example, when a pixel subjected to color suppression is placed at the center of the 5×5 window with respect to five Bayer image signals illustrated in FIG. 11, a line "a" includes the pixel subjected to color suppression, lines "a+2" and "a+1" are preceding adjacent lines, and lines "a−1" and "a−2" are succeeding adjacent lines. A Bayer image signal corresponding to the line "a+2" is input and moved from the line LM1 to the line LM4. When the Bayer image signal corresponding to the line "a+2" is moved from the line LM1 to the line LM2, a Bayer image signal corresponding to the line "a+1" is input to the line LM1. In this manner, Bayer image signals respectively corresponding to the lines "a+2" through "a−1" are stored in the lines LM4 through LM1, respectively. Thereafter, when a Bayer image signal corresponding to the line "a−2" is input, the Bayer image signals respectively corresponding to the five lines "a+2" through "a−2" are simultaneously provided in parallel to a pseudo-luminance generator 31 and an interpolator 32.

The pseudo-luminance generator 31 generates pseudo-luminance values for the adjacent lines "a+2", "a+1", "a−1", and "a−2" with respect to the line "a" including the central pixel using the conventional method described with reference to FIGS. 12 and 13 above.

The interpolator 32 may perform interpolation on every pixel in each of the five input lines using a conventional method. An output of the interpolator 32 includes RGB information for each pixel.

Conventionally, pseudo-luminance values for five lines are generated using a non-interpolated Bayer pattern signal. However, according to some embodiments of the present invention, for a line including a pixel subjected to edge detection among the five lines, pixels are interpolated. That is, a G value that primarily influences luminance is given to each pixel. Accordingly, a value YG is obtained using an interpolated value for a line including a pixel being subjected to edge detection. The YG value is input to the edge detector 34 as a luminance value for the line including the pixel subjected to edge detection, and values "YG−2", "YG−1", "YG+1", and "YG+2" output from the pseudo-luminance generator 31 are input to the edge detector 34 as luminance values for the adjacent lines.

The edge detector 34 detects an edge using a 5×5 window or a 3*3 window for the five lines respectively having the luminance values, and using a corresponding edge detection method. Since the adjacent lines have pseudo-luminance values, an edge detection error may occur in a vertical direction. However, since the interpolated luminance value is used for the line having the pixel subjected to edge detection, edge detection errors in a horizontal direction may be reduced.

An interpolated RGB signal is converted to a format including a luminance component Y and chrominance components Cb/Cr by a color space converter 33. The luminance component Y is subjected to edge enhancement using an output of the edge detector 34 in an edge enhancer 35, and is then output as an enhanced luminance component Y'.

The output of the edge detector 34 is also input to a color suppression coefficient calculator 36, which calculates a color suppression coefficient using the above-described non-linear conversion. A color suppressor 37 suppresses color with respect to the chrominance components Cb/Cr using the color suppression coefficient, thereby outputting color-suppressed chrominance components Cb'/Cr'.

In some further embodiments of the present invention, an edge detection error occurring in the vertical direction due to the use of pseudo-luminance values may be compensated for by adding a compensator between the pseudo-luminance generator and the color suppression coefficient calculator. For example, FIG. 4 is a block diagram of a digital image signal processing apparatus 400 according to further embodiments of the present invention including a compensator 48 between a pseudo-luminance generator 41 and a color suppression coefficient calculator 46.

Figure 4:
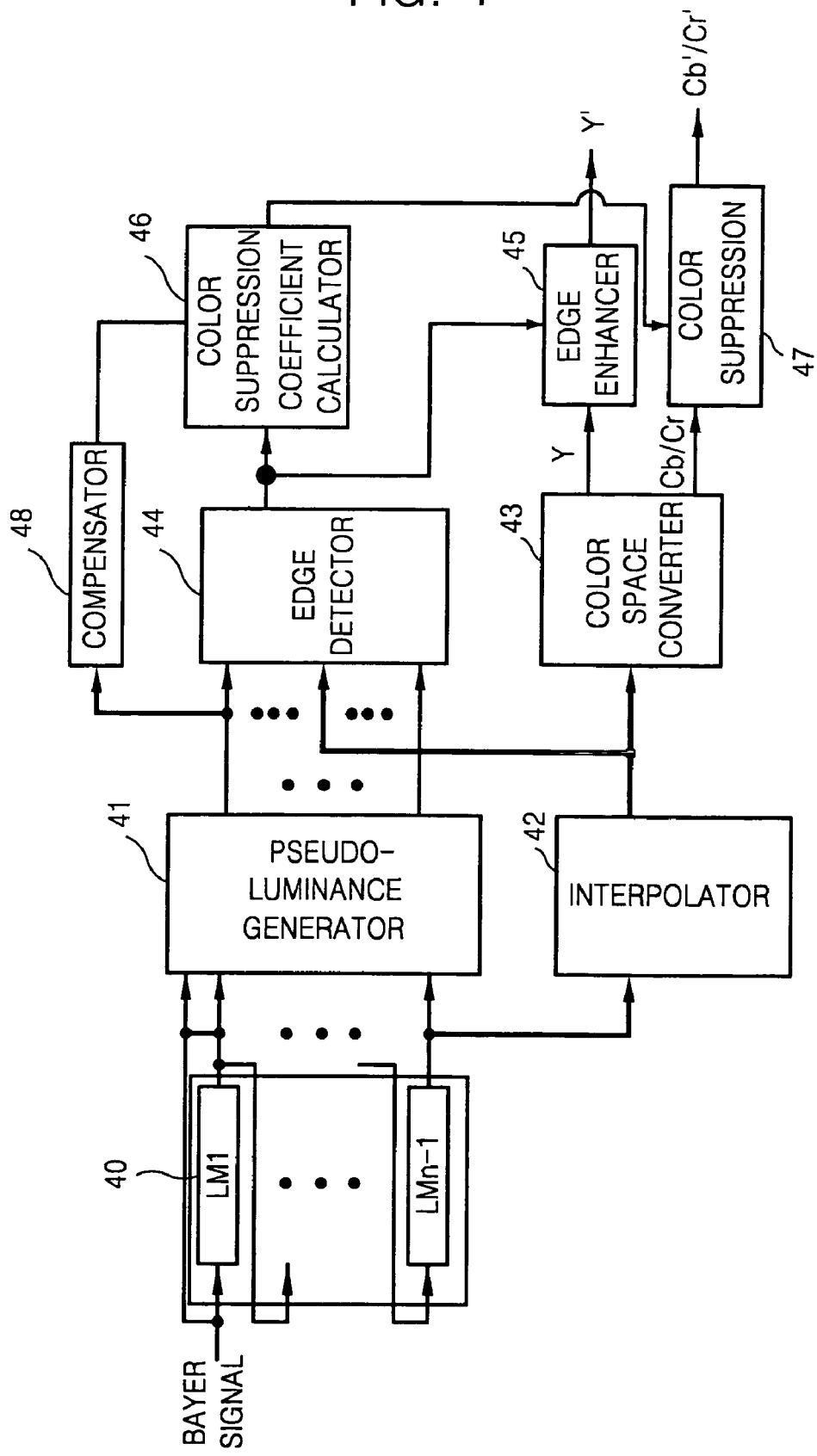
FIG. 4 is a block diagram of a digital image signal processing apparatus according to further embodiments of the present invention.

Referring to FIG. 4, the digital image signal processing apparatus 400 is similar to the digital image signal processing apparatus 200 of FIG. 2. In particular, the digital image signal processing apparatus 400 includes a line memory 40 having a plurality of lines LM1 through LMn−1 (where "n" is an integer greater than 1) to store a Bayer digital signal in line units. The apparatus 400 further includes an interpolator 42 configured to perform interpolation using Bayer pattern signals simultaneously provided from the line memory 40 through the lines LM1 through LMn−1. A color space converter 43 converts an interpolated signal to a format including a luminance component and chrominance components. A pseudo-luminance generator 41 generates a pseudo-luminance signal for each line as a luminance component to be used for edge detection using only one color, which may be a color that primarily influences luminance in an image signal of a Bayer pattern, based on the Bayer pattern signals provided from the line memory 40. An edge detector 44 detects an edge using, as a luminance signal, a color that primarily influences luminance in an interpolated signal for a line including pixels to be subjected to edge detection, and using pseudo-luminance signals for other lines. An edge enhancer 45 enhances an edge of a luminance component signal Y obtained through color space conversion using an output of the edge detector 44.

The digital image signal processing apparatus 400 further includes a compensator 48 configured to detect an edge using fine tuning to compensate for an edge detection error of the edge detector 44 that may occur in a vertical direction. A color suppression coefficient calculator 46 performs non-linear conversion using edge information provided from the edge detector 44 and the compensator 48 to calculate a color suppression coefficient, and a color suppressor 47 suppresses pseudo-color components included in chrominance component signals Cb/Cr using the color suppression coefficient.

Hereinafter, detailed descriptions of the same elements as those illustrated in FIG. 2 will be omitted. The structure illustrated in FIG. 4 is different from that illustrated in FIG. 2 in that the compensator 48 is further provided between the pseudo-luminance generator 41 and the color suppression coefficient calculator 46. The compensator 48 receives the same inputs as the edge detector 44. The compensator 48 calculates a gradient of pixel values in a window and outputs an edge detection result that may be more fine-tuned than that of the edge detector 44.

The compensator 48 may operate according to the following equation:

$$\text{Variation}=\text{Max } \{ \text{GAIN0}*(\text{abs}[D_{L-2}-2-D_{L-2}-1]+ \\ \text{abs}[D_{L-2}-1-D_{L-2}]+\text{abs}[D_{L-2}-D_{L-2}+1]+ \\ \text{abs}[D_{L-2}+1-D_{L-2}+2]),$$

$$\text{GAIN1}*(\text{abs}[D_{L-1}-2-D_{L-1}-1]+\text{abs}[D_{L-1}-1-D_{L-1}]+ \\ \text{abs}[D_{L-1}-D_{L+1}+1]+\text{abs}[D_{L-1}+1-D_{L-1}+2]),$$

$$\text{GAIN2}*(\text{abs}[D_L-2-D_L-1]+\text{abs}[D_L-1-D_L]+\text{abs}[D_L-D_L+1]+\text{abs}[D_L+1-D_L+2]),$$

$$\text{GAIN3}*(\text{abs}[D_{L+1}-2-D_{L+1}-1]+\text{abs}[D_{L+1}-1-D_{L+1}]+ \\ \text{abs}[D_{L+1}-D_{L+1}+1]+\text{abs}[D_{L+1}+1-D_{L+1}+2]),$$

$$\text{GAIN4}*(\text{abs}[D_{L+2}-2-D_{L+2}-1]+\text{abs}[D_{L+2}-1-D_{L+2}]+ \\ \text{abs}[D_{L+2}-D_{L+2}+1]+\text{abs}[D_{L+2}+1-D_{L-2}+2]),$$

$$\text{GAIN5}*(\text{abs}[D_{L-2}-2-D_{L-1}-2]+\text{abs}[D_{L-1}-2-D_L-2)+ \\ \text{abs}[D_L-2-D_{L+1}-2]+\text{abs}[D_{L+1}-2-D_{L+2}-2]),$$

$$\text{GAIN6}*(\text{abs}[D_{L-2}-1-D_{L-1}-1]+\text{abs}[D_{L-1}-1-D_{L-1}]+ \\ \text{abs}[D_L-1-D_{L+1}-1]+\text{abs}[D_{L+1}-1-D_{L+2}-1]),$$

$$\text{GAIN7}*(\text{abs}[D_{L-2}-D_{L-1}]+\text{abs}[D_{L-1}-D_L]+\text{abs}[D_L-D_{L+1}]+\text{abs}[D_{L+1}-D_{L+2}]),$$

$$\text{GAIN8}*(\text{abs}[D_{L-2}+1-D_{L-1}+1]+\text{abs}[D_{L-1}+1-D_L+1]+ \\ \text{abs}[D_L+1-D_{L+1}+1]+\text{abs}[D_{L+1}+1-D_{L+2}+1]),$$

$$\text{GAIN9}*(\text{abs}[D_{L-2}-2-D_{L-1}-2]+\text{abs}[D_{L-1}+2-D_L+2]+ \\ \text{abs}[D_L+2-D_{L+1}+2]+\text{abs}[D_{L-1}+2-D_{L+2}+2])\}.$$

According to the foregoing equation, the largest gradient value among 10 gradient values associated with a pixel is used to determine if an edge is present. That is, five values are obtained by multiplying the sums of luminance differences between pixels adjacent in the horizontal direction with respect to five lines by five different gains, respectively, and five values are obtained by multiplying the sums of luminance differences between pixels adjacent in the vertical direction with respect to five lines by five different gains, respectively, and the largest gradient value is used to determine if an edge is present.

The overall size of a window and an overall value can be controlled by adjusting gain values GAIN0 through GAIN9. In addition, when a portion that is supposed to have an edge is determined not to have an edge, the presence of an edge can be verified by adjusting the gains GAIN0 through GAIN9.

The color suppression coefficient calculator 46 includes a section for calculating a color suppression coefficient using an edge value provided from the edge detector 44 and a section for calculating a color suppression coefficient using an edge value provided from the compensator 48. The color suppression coefficient calculator 46 calculates a color suppression coefficient first using the edge value provided from the edge detector 44 and then, if no edge is detected, verifies the absence of an edge using the edge value provided from the compensator 48 for more accurate observation.

As described above, since the presence of an edge may be more accurately verified using the compensator 48 and the color suppression coefficient is calculated based on a more accurate verification, an error occurring in an edge value in the vertical direction due to the use of pseudo-luminance values can be reduced.

Figure 5:
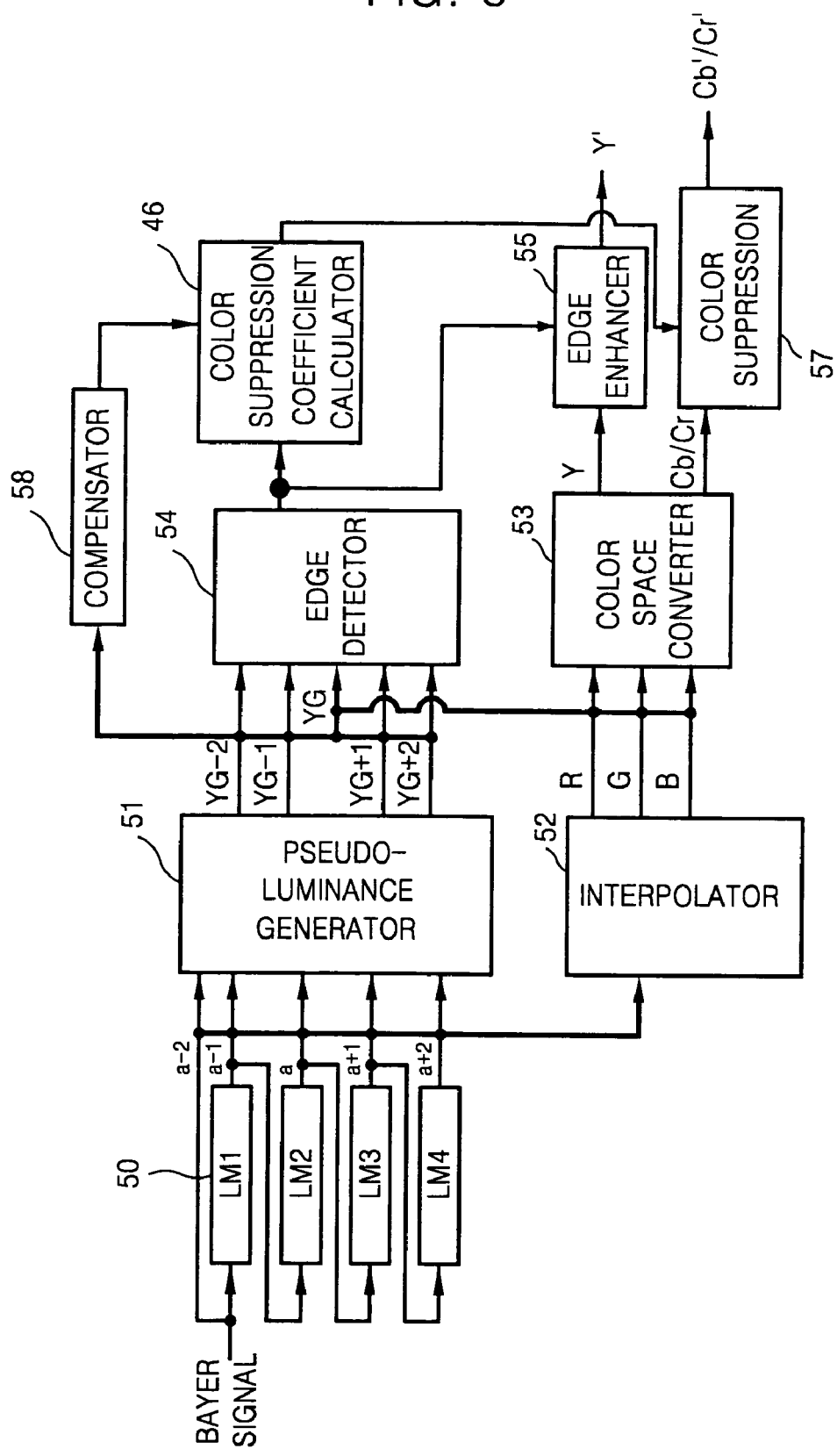
FIG. 5 illustrates an example in which a 5×5 window and a Bayer pattern having an RGB format are used in the digital image signal processing apparatus illustrated in FIG. 4.

FIG. 5 illustrates an example of a digital image processing apparatus 500 in which a 5×5 window and a Bayer pattern having an RGB format are used in the digital image signal processing apparatus 400 illustrated in FIG. 4. Detailed descriptions of elements operating in the same manner as those illustrated in FIGS. 3 and 4 will be omitted.

A pseudo-luminance generator 51 generates pseudo-luminance values for the adjacent lines "a+2", "a+1", "a−1", and "a−2" with respect to the line "a" including the central pixel, as described above.

An interpolator 52 performs interpolation on every pixel in each of the five input lines using a conventional method.

A value YG obtained using an interpolated value is input to an edge detector 54 as a luminance value for the line including the pixel subjected to edge detection, and values "YG−2", "YG−1", "YG+1", and "YG+2" output from the pseudo-luminance generator 51 are input to the edge detector 54 as luminance values for the adjacent lines.

The edge detector 54 detects an edge using a 5×5 window or a 3*3 window for the five lines respectively based on the luminance values, and using a corresponding edge detection method. Since the adjacent lines have pseudo-luminance values, an edge detection error may occur in the vertical direction. However, the edge detection error can be reduced by performing fine tuning using a compensator 58, as described above.

An interpolated RGB signal is converted to a format including a luminance component Y and chrominance components Cb/Cr by a color space converter 53. The luminance component Y is subjected to edge enhancement using an output of the edge detector 54 in an edge enhancer 55 and is then output as an enhanced luminance component Y'.

The output of the edge detector 54 is also input to a color suppression coefficient calculator 56, which calculates a color suppression coefficient with respect to each of the outputs of the compensator 58 and the edge detector 54. If no edge is detected by the edge detector 54, fine tuning is performed using the output of the compensator 58 to verify the edge detection and to calculate a color suppression coefficient using an edge value obtained through the verification of the edge detection.

Figure 6:
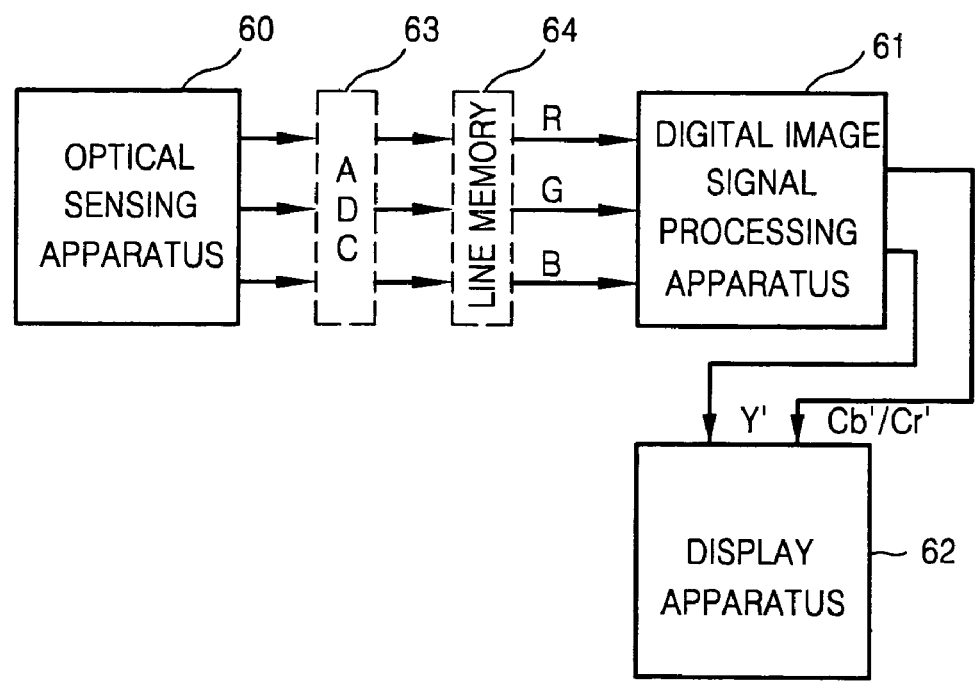
FIG. 6 is a block diagram of an image system including the digital image signal processing apparatus illustrated in any one of FIGS. 2 through 5, according to some embodiments of the present invention.

FIG. 6 is a block diagram of an image system 600 including a digital image signal processing apparatus as illustrated in any one of FIGS. 2 through 5, according to some embodiments of the present invention. Referring to FIG. 6, the image system 600 includes an optical sensing apparatus 60 configured to receive an optical signal and to convert it into an electrical signal. An analog-to-digital converter (ADC) 63 converts an analog signal output from the optical sensing apparatus 60 into a digital signal, and a line memory 64 including a plurality of lines stores a digitized image signal of a Bayer pattern in line (e.g., row data) units. A digital image signal processing apparatus 61 configured as described with reference to FIGS. 2 through 5 performs edge detection, interpolation, and color suppression using the digitized Bayer pattern image signal provided in line units, and a display apparatus 62 displays an image using image signals Y' and Cb'/Cr', provided from the digital image signal processing apparatus 61.

The optical sensing apparatus 60 may be implemented using various types of sensors, for example, an image sensor such as a charge coupled device (CCD) or a complementary metal oxide semiconductor (CMOS) image sensor (CIS).

In some embodiments, the optical sensing apparatus 60 may include an ADC and may output a digital signal, in which case the ADC 63 may be omitted. Alternatively, the digital image signal processing apparatus 61 may include an ADC. The line memory 64 may also be included in the digital image signal processing apparatus 61 and/or the optical sensing apparatus 60.

Although not shown, the display apparatus 62 may include a display unit and a driving unit. The display apparatus 62 may include any one of available display devices such as a liquid crystal display (LCD) and/or a plasma display panel (PDP).

Figure 7:
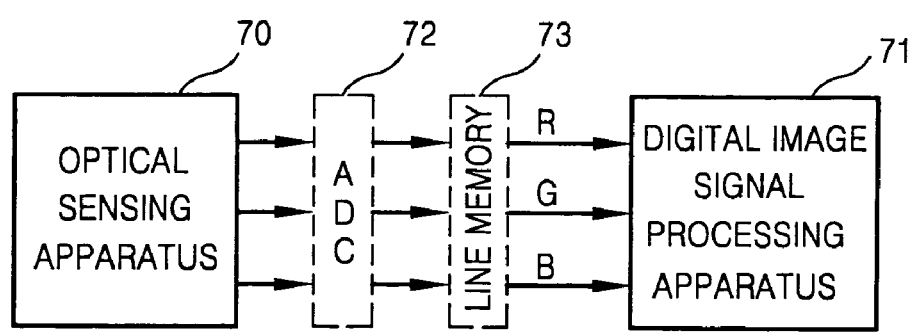
FIG. 7 is a block diagram of an image system including the digital image signal processing apparatus illustrated in any one of FIGS. 2 through 5, according to further embodiments of the present invention.

FIG. 7 is a block diagram of an image system 700 including a digital image signal processing apparatus as illustrated in any one of FIGS. 2 through 5, according to further embodiments of the present invention. Referring to FIG. 7, the image system includes a optical sensing apparatus 70 configured to receive an optical signal and to convert it into an electrical signal. An ADC 72 converts an analog signal output from the optical sensing apparatus 70 into a digital signal, and a line memory 73 including a plurality of lines stores a digitized image signal of a Bayer pattern in line (e.g., row data) units. A digital image signal processing apparatus 71 configured as described with reference to FIGS. 2 through 5 performs edge detection, interpolation, and color suppression using the digitized Bayer pattern image signal provided in line units.

The image system 700 illustrated in FIG. 7 is structured by eliminating the display apparatus 62 from the image system illustrated in FIG. 6. For example, a camera may include the image system 700 illustrated in FIG. 7. Descriptions of the same elements as those illustrated in FIG. 6 will be omitted.

Figure 8:
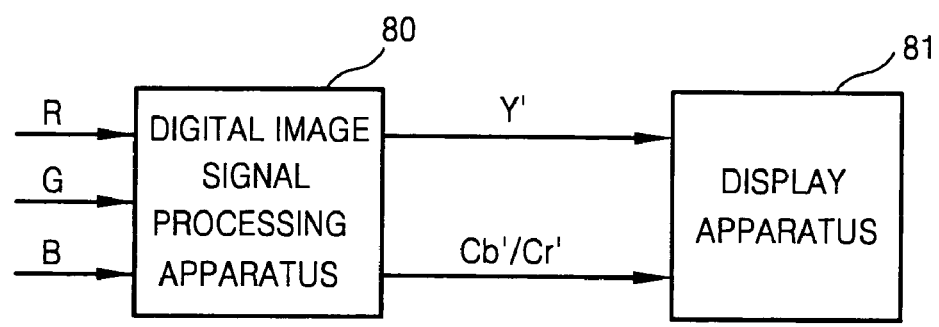
FIG. 8 is a block diagram of an image system including the digital image signal processing apparatus illustrated in any one of FIGS. 2 through 5, according to still further embodiments of the present invention.

FIG. 8 is a block diagram of an image system 800 including a digital image signal processing apparatus as illustrated in any one of FIGS. 2 through 5, according to still further embodiments of the present invention. Referring to FIG. 8, the image system 800 includes a digital image signal processing apparatus 80 configured as described with reference to FIGS. 2 through 5 to perform edge detection, interpolation, and color suppression using an image signal of an RGB Bayer pattern provided from an optical sensing apparatus or the like. A display apparatus 81 displays an image using image signals Y' and Cb'/Cr' provided from the digital image signal processing apparatus 80. If the image signal of the Bayer pattern is an analog signal, the digital image signal processing apparatus 80 may include an ADC. In addition, the digital image signal processing apparatus 80 may include a line memory. Descriptions of the same elements as those illustrated in FIGS. 6 and 7 will be omitted.

Figure 9:
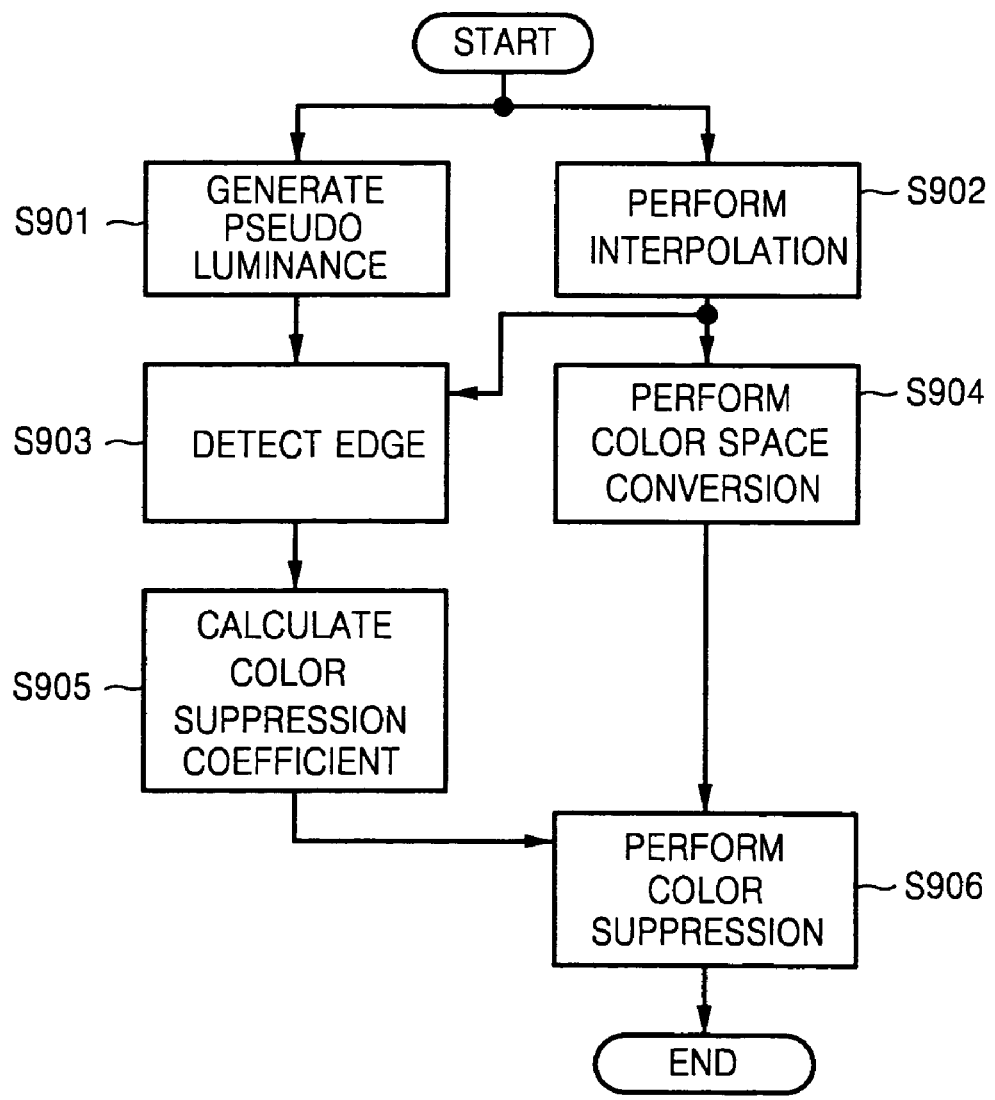
FIG. 9 is a flowchart illustrating methods of processing a digital image signal according to some embodiments of the present invention.

FIG. 9 is a flowchart illustrating methods of processing a digital image signal according to some embodiments of the present invention. In operation S902, interpolation is performed on a digitized Bayer pattern signal. In a parallel operation S901, pseudo-luminance values to be used in edge detection are generated from the Bayer pattern signal that is not subjected to the interpolation.

In operation S904, color space conversion is performed on the interpolated signal, thereby generating a signal expressed in luminance and chrominance.

In operation S903, edge detection is performed using a predetermined window size, a luminance value of a line including a pixel subjected to edge detection provided from the interpolation result, and pseudo-luminance values of adjacent lines. In particular, a G signal (which may primarily influence the luminance value) corresponding to the line including the pixel subjected to the edge detection in the interpolated signal is used as the luminance value. For example, if a 5*5 window is used in the edge detection, luminance values of two lines preceding the current line and two lines succeeding the current line are calculated using a conventional method (which uses a G signal) as the pseudo-luminance values.

In operation S905, a color suppression coefficient is calculated by performing non-linear conversion using an edge detection value obtained through the edge detection operation.

In operation S906, color suppression is performed on a chrominance component of the signal, which is obtained through the color space conversion performed in operation S904, using the color suppression coefficient.

Figure 10:
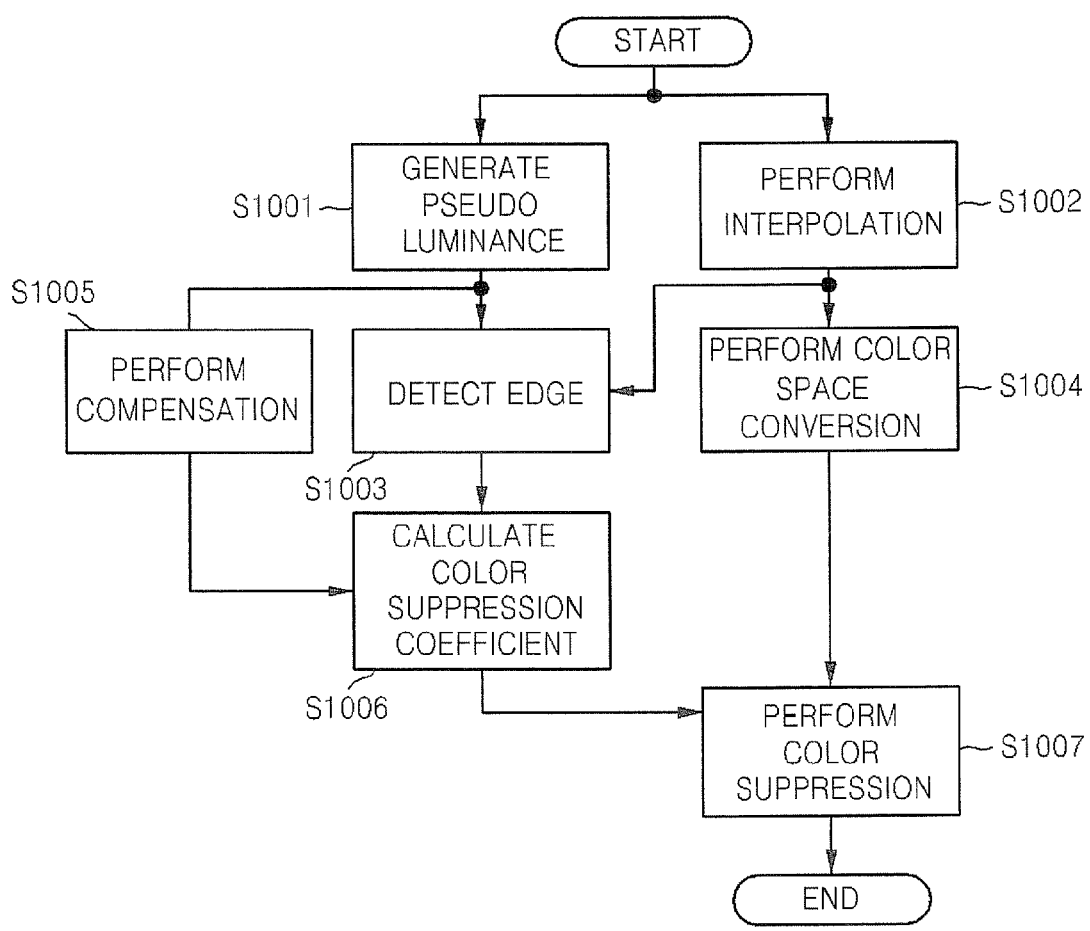
FIG. 10 is a flowchart illustrating methods of processing a digital image signal according to further embodiments of the present invention.

FIG. 10 is a flowchart illustrating methods of processing a digital image signal according to further embodiments of the present invention. In operation S1002, interpolation is performed on a digitized Bayer pattern signal. In a parallel operation S1001, pseudo-luminance values to be used in edge detection are generated from the Bayer pattern signal that is not subjected to interpolation.

In operation S1004, color space conversion is performed on the interpolated signal, thereby generating a signal expressed in luminance and chrominance.

In operation S1003, edge detection is performed using a predetermined window, a luminance value of a line including a pixel subjected to edge detection, and pseudo-luminance values of adjacent lines. In particular, a G signal (that may primarily influence the luminance value) corresponding to the line including the pixel subjected to the edge detection in the interpolated signal is used as the luminance value. For example, if a 5*5 window is used in the edge detection, luminance values of two lines preceding the current line and two lines succeeding the current line are calculated using a conventional method (which uses a G signal) as the pseudo-luminance values.

Since the luminance value obtained from interpolated pixel values is used in horizontal edge detection and the pseudo-luminance values obtained from the non-interpolated Bayer pattern signal are used in vertical edge detection, an edge detection error may occur in the vertical direction. To compensate for the edge detection error, in operation S1005, the sum of luminance differences between adjacent pixels in each of vertical and horizontal lines is multiplied by a corresponding gain, thereby calculating gradients of the respective vertical and horizontal lines, and the largest one of the calculated gradients may be used for edge detection. Accordingly, an edge value is obtained through fine tuning. In other words, if an edge is not detected through an edge detection process, the absence of an edge is verified through a compensation process.

In operation S1006, a color suppression coefficient is calculated by performing non-linear conversion using an edge detection value obtained through the edge detection operation and the compensation operation.

In operation S1007, color suppression is performed on a chrominance component of the signal, which is obtained through the color space conversion performed in operation S1004, using the color suppression coefficient.

As described above, since data interpolated using a luminance value of a line including a pixel subjected to edge detection is used for edge detection, pseudo-color occurring at a high-frequency edge due to aliasing appearing in edge detection using pseudo-luminance values may be reduced. In addition, an edge detection error in the vertical direction may be reduced by adding a compensator.

According to some embodiments of the present invention, occurrence of pseudo-color may be reduced without using an additional element such as an additional line memory, thereby increasing the quality of an image signal.

In the drawings and specification, there have been disclosed typical embodiments of the invention and, although specific terms are employed, they are used in a generic and descriptive sense only and not for purposes of limitation, the scope of the invention being set forth in the following claims.

What is claimed is:

1. An apparatus for processing a digital image signal, comprising:
    an interpolator configured to interpolate a digital Bayer pattern signal to provide an interpolated image signal;
    a color space converter configured to convert the interpolated image signal into a converted signal having a format including a luminance component and a chrominance component;
    a pseudo-luminance generator configured to generate pseudo-luminance signals for respective lines of the Bayer pattern signal;
    an edge detector configured to detect an edge in the Bayer pattern signal using a part of the interpolated signal as a luminance signal for a line of the Bayer pattern signal including a pixel subjected to edge detection and using the pseudo-luminance signals for adjacent lines;
    a color suppression coefficient calculator configured to generate a color suppression coefficient in response to edge information provided from the edge detector; and
    a color suppressor configured to suppress pseudo-color present in the chrominance component of the converted signal using the color suppression coefficient.

2. The apparatus of claim 1, wherein the edge detector is configured to use a signal that primarily influences luminance in the interpolated signal as the luminance signal with respect to the line including the pixel subjected to edge detection.

3. The apparatus of claim 1, wherein the pseudo-luminance generator is configured to generate the pseudo-luminance signals using at least a color that primarily influences the luminance in the Bayer pattern signal.

4. The apparatus of claim 1, further comprising a line memory including N−1 lines, wherein the Bayer pattern signal is input in parallel through N lines and wherein N is an integer greater than 2.

5. The apparatus of claim 1, further comprising an edge enhancer configured to enhance edge information in the luminance component of the converted signal in response to an output of the edge detector.

6. An apparatus for processing a digital image signal, comprising:
    an interpolator configured to interpolate a digital Bayer pattern signal to provide an interpolated image signal;
    a color space converter configured to convert the interpolated image signal into a converted signal having format including a luminance component and a chrominance component;
    a pseudo-luminance generator configured to generate pseudo-luminance signals for respective lines of the Bayer pattern signal;
    an edge detector configured to generate a first edge metric relative to the Bayer pattern signal using a part of the interpolated image signal as a luminance signal for a line of the Bayer pattern signal including a pixel subjected to edge detection and using the pseudo-luminance signals for adjacent lines;
    a compensator configured to generate a second edge metric relative to the Bayer pattern signal to compensate for an edge detection error occurring in the edge detector;
    a color suppression coefficient calculator configured to generate a color suppression coefficient using the first edge metric and the second edge metric; and
    a color suppressor configured to suppress pseudo-color present in the chrominance component of the converted signal using the color suppression coefficient.

7. The apparatus of claim 6, wherein the compensator is configured to compensate for an edge detection error occurring in a vertical direction in the edge detector.

8. The apparatus of claim 6, wherein the compensator is configured such that, if no edge is found by the edge detector, the absence of an edge is verified using the compensator.

9. The apparatus of claim 6, wherein the compensator is configured to multiply a sum of luminance differences between adjacent pixels in each of vertical and horizontal lines in an edge detection window by a corresponding gain, thereby generating gradients of the respective vertical and horizontal lines, and to output a largest one of the gradients as a value of the second edge metric.

10. The apparatus of claim 6, wherein the edge detector is configured to use a signal that primarily influences luminance in the interpolated signal as the luminance signal with respect to the line including the pixel subjected to the edge detection.

11. The apparatus of claim 6, wherein the pseudo-luminance generator is configured to generate the pseudo-luminance signals using at least a color that primarily influences the luminance in the Bayer pattern signal.

12. The apparatus of claim 6, further comprising a line memory including N−1 lines, wherein the Bayer pattern signal is input in parallel through N lines, and wherein N is integer greater than 2.

13. The apparatus of claim 6, further comprising an edge enhancer configured to enhance edge information in the luminance component of the converted signal in response to an output of the edge detector.

14. A system comprising:
an optical sensing apparatus configured to receive an optical signal and to convert the optical signal into a digital Bayer pattern signal; and
a digital image signal processing apparatus configured to perform digital image processing on the Bayer pattern signal,
wherein the digital image signal processing apparatus comprises:
an interpolator configured to interpolate the digital Bayer pattern signal to provide an interpolated image signal;
a color space converter configured to convert the interpolated image signal into a format including a luminance component and a chrominance component;
a pseudo-luminance generator configured to generate pseudo-luminance signals for respective lines of the Bayer pattern signal;
an edge detector configured to detect an edge in the Bayer pattern signal using a part of the interpolated signal as a luminance signal for a line of the Bayer pattern signal including a pixel subjected to edge detection and using the pseudo-luminance signals for adjacent lines;
a color suppression coefficient calculator configured to generate a color suppression coefficient in response to edge information provided from the edge detector; and
a color suppressor configured to suppress pseudo-color present in the chrominance component of the converted signal using the color suppression coefficient.

15. A system comprising:
an optical sensing apparatus configured to receive an optical signal and to convert the optical signal into a digital Bayer pattern signal; and
a digital image signal processing apparatus configured to perform digital image processing on the Bayer pattern signal;
wherein the digital image signal processing apparatus comprises:
an interpolator configured to interpolate the Bayer pattern signal to provide an interpolated image signal;
a color space converter configured to convert the interpolated image signal into a format including a luminance component and a chrominance component;
a pseudo-luminance generator configured to generate pseudo-luminance signals for respective lines of the Bayer pattern signal;
an edge detector configured to generate a first edge metric relative to the Bayer pattern signal using a part of the interpolated image signal as a luminance signal for a line of the Bayer pattern signal including a pixel subjected to edge detection and using the pseudo-luminance signals for adjacent lines;
a compensator configured to generate a second edge metric in relative to the Bayer pattern signal to compensate for an edge detection error occurring in the edge detector;
a color suppression coefficient calculator configured to generate a color suppression coefficient using the first edge metric and the second edge metric; and
a color suppressor configured to suppress pseudo-color present in the chrominance component of the converted signal using the color suppression coefficient.

16. The system of claim 14, further comprising a display apparatus configured to display an image using an image signal provided from the digital image signal processing apparatus.

17. A method of processing a digital image signal using a processing apparatus, comprising:
interpolating a digital Bayer pattern signal to form an interpolated image signal;
generating pseudo-luminance values using the Bayer pattern signal;
converting the interpolated image signal into a format expressed in luminance and chrominance to generate a converted signal;
detecting an edge in the Bayer pattern signal using a part of the interpolated image signal as a luminance signal for a line including a pixel subjected to edge detection and using the pseudo-luminance values for adjacent lines;
generating a color suppression coefficient in response to the edge detection; and
suppressing pseudo-color present in the chrominance of the converted signal using the color suppression coefficient.

18. The method of claim 17, wherein detecting the edge comprises detecting the edge using a signal that primarily influences luminance in the interpolated image signal as the luminance signal with respect to the line including the pixel subjected to the edge detection.

19. The method of claim 17, wherein generating the pseudo-luminance values comprises generating the pseudo-luminance values using at least a color that primarily influences the luminance in the Bayer pattern signal.

20. A method of processing a digital image signal using a processing apparatus, comprising:
interpolating a digital Bayer pattern signal to generate an interpolated image signal;
generating pseudo-luminance values to be used for edge detection using the Bayer pattern signal;
converting the interpolated image signal into a format expressed in luminance and chrominance;
generating a first edge metric from the Bayer pattern signal using a part of the interpolated image signal as a luminance signal for a line including a pixel subjected to edge detection and using the pseudo-luminance values for adjacent lines;
generating a second edge metric from the Bayer pattern signal to compensate for an edge detection error occurring in the first edge metric;
generating a color suppression coefficient in response to the first edge metric and the second edge metric; and
suppressing pseudo-color present in the chrominance of the converted signal using the color suppression coefficient.

21. The method of claim 20, wherein generating the second edge metric comprises compensating for an edge detection error occurring in a vertical direction during the generation of the first edge metric.

22. The method of claim 20, wherein, if no edge is indicated by the first edge metric, the absence of an edge is verified through the generation of the second edge metric.

23. The method of claim 22, wherein generating the second edge metric comprises multiplying a sum of luminance differences between adjacent pixels in each of vertical and horizontal lines in an edge detection window by a corresponding gain to generate gradients of the respective vertical and horizontal lines and outputting a largest one of the gradients as a value of the second edge metric.

24. The method of claim 22, wherein generating the first edge metric comprises detecting an edge using a signal that primarily influences luminance in the interpolated signal as the luminance signal with respect to the line including the pixel subjected to the edge detection.

25. The method of claim 23, wherein generating the pseudo-luminance values comprises generating the pseudo-luminance values using at least a color that primarily influences the luminance in the Bayer pattern signal.

* * * * *